United States Patent

Diesel

[11] Patent Number: 5,574,650
[45] Date of Patent: Nov. 12, 1996

[54] METHOD AND APPARATUS FOR CALIBRATING THE GYROS OF A STRAPDOWN INERTIAL NAVIGATION SYSTEM

[75] Inventor: John W. Diesel, Woodland Hills, Calif.

[73] Assignee: Litton Systems, Inc., Woodland Hills, Calif.

[21] Appl. No.: 39,725

[22] Filed: Mar. 23, 1993

[51] Int. Cl.⁶ .................................. G06F 165/00
[52] U.S. Cl. .................... 364/453; 364/454; 364/571.02; 73/178 R
[58] Field of Search ................... 364/449, 453, 364/454, 571.01, 571.02, 571.06; 73/1 R, 178 R, 504; 244/177

[56] References Cited

U.S. PATENT DOCUMENTS

| | | | |
|---|---|---|---|
| 3,702,477 | 11/1972 | Brown | 364/453 |
| 4,032,759 | 6/1977 | Danik | 364/453 |
| 4,212,443 | 7/1980 | Duncan et al. | 364/453 |
| 4,303,978 | 12/1981 | Shaw et al. | 364/454 |

OTHER PUBLICATIONS

John W. Diesel, "Calibration of a Ring Lawer Gyro Inertial Navigation System For Minimum Velocity Error," *Fourteenth Biennial Guidance Test Symposium*, Central Inertial Guidance Test Facility, Guidance Test Division, 6585th Test Group, Holloman AFB, vol. II (Oct. 3–5, 1989), pp. 1–1 through 1–20.

*Primary Examiner*—Gary Chin
*Attorney, Agent, or Firm*—Elliott N. Kramsky

[57] ABSTRACT

A method and apparatus for minimizing the effect of lateral velocity transients upon an aircraft inertial instrument calibration process of the type in which cross-track velocity is measured and utilized to correct for the east component of gyro bias error. A "cross-track position" value is obtained by integration of the cross-track velocity. A Kalman filter calculates a plurality of gain values corresponding to measurements of crab angle, lever arm, north and east velocity, heading angle and rate of change of heading angle and those gain values are applied to the cross-track position value to obtain error values for each of such parameters. The calculated error values are then employed as corrections to, or calibrations of, the inertial instrument outputs.

12 Claims, 4 Drawing Sheets

METHOD AND APPARATUS FOR CALIBRATING THE GYROS OF A STRAPDOWN INERTIAL NAVIGATION SYSTEM

BACKGROUND

1. Field of the Invention

The present invention relates to a method for calibrating the strapdown inertial navigation system of a taxiing aircraft. More particularly, this invention pertains to a method for improving the performance of an on-board calibration system that corrects gyro bias errors by observing indicated inertial velocities.

2. Description of the Prior Art

Aircraft inertial navigation relies upon the integration of data throughout a sequence that is begun when the aircraft is prepared for takeoff and which ends when the aircraft has landed and motion has ceased. The inertial navigation apparatus of an aircraft includes various components, including accelerometers and gyroscopes, that convert the effects of inertial forces into acceleration, velocity and position measurements. The accelerometers determine acceleration forces along three orthogonal sensitive axes and this data is converted, through integrations, into the aircraft's velocity and position. In a strapdown system in which the accelerometers are fixed in relation to the geometry of the aircraft, the gyroscopes that measure the aircraft's attitude also measure that of the accelerometer platforms. The data measured by the gyros is utilized to resolve the accelerometer outputs continuously along the appropriate space axes.

The standard inertial instruments are well-suited for obtaining the necessary flight data in an aircraft when airborne. However, important calibration processes take place at the beginning of the flight and prior to the airborne phase to assure that the ultimate measurements of acceleration, velocity and position are substantially free of inaccuracy and bias. Thus, during initial alignment, the precise location and the attitudes of the inertial navigation instruments must be determined and entered into the flight computer, a process that corresponds to the "leveling of the reference platform" that takes place in a non-strapdown or gimballed navigation system.

After initial instrument alignment, the flight computer enters the navigation mode and remains in this mode for the remainder of the flight. While in the navigation mode, the flight computer receives information from the accelerometers and keeps track of the attitudes of the inertial instruments by means of the gyros. Such attitude information is received from the integration of the rate signals received from the gyroscopes.

The initial alignment mode also serves as an opportunity to correct instrument errors. An important error of this sort is the body component of gyro bias error. This error refers to the fixed offset or bias of the angular rate output of the gyros along the aircraft's pitch and roll axes. Unfortunately, in the prior art it has only been possible to partially correct this error.

Conventionally, this problem is addressed by resolving the gyro rates about the pitch and roll axes to a north and east system. A process known as "mini biasing" is then employed during alignment (and prior to taxiing) to correct the gyro components along the northern axis. Unfortunately, the error components along the east axis are unobservable during initial alignment. Such unobservability follows from the fact that the initial azimuth determination (i.e. gyrocompassing) utilizes the east component of the gyro outputs to determine azimuth since it is known that the east component of the Earth's angular rate should be zero. Thus, such components are assumed to be correct. That is, the direction of the Earth's rotation rate is employed to determine the initial azimuth of the instrument platform.

FIGS. 1(a) and 1(b) are top plan views of an aircraft during the alignment mode and the taxiing portion of the navigation mode respectively. As shown in FIG. 1(a), at the end of alignment the east component of gyro bias error $\epsilon_{E_o}$ is balanced by the west component of the Earth's angular rate error $\delta\Omega_W$ $(=\vec{\phi}_z \times \vec{\Omega}_N$ where $\vec{\Omega}_N$ is the north component of the earth's angular rotation rate) resulting from a residual azimuth error $\phi_z$. For this reason, velocity errors are not observed until the aircraft changes heading during the taxiing portion of the navigation phase. As shown in FIG. 1(b), when a change of heading occurs, the original east gyro bias error $\epsilon_{E_o}$ will rotate with the taxiing aircraft and will no longer lie in the east coordinate direction. The west component of the Earth's angular rate error $\delta\Omega_W$ will continue to lie in the west coordinate direction as it is determined by the navigation reference axes rather than by the aircraft body axes.

The absence of a method for determining or, needless to say, correcting the east axis component of gyro error $\epsilon_{E_o}$ can lead to significant difficulties during flight as this error $\epsilon_{E_o}$ will cause position errors to accumulate as a result of the integration process in aircraft navigation.

A method for overcoming the above-referenced inability to observe the east component of gyro bias error during the alignment phase is described by the inventor in "Calibration of a Ring Laser Gyro Inertial Navigation System For Minimum Velocity Error", *Fourteenth Biennial Guidance Test Symposium*, Central Inertial Guidance Test Facility, Guidance Test Division, 6585th Test Group, Holloman AFB, Vol. II (Oct. 3, 4, 5, 1989) at pages 1-1 through 1-20. That paper describes a system for inferring the original east component of gyro error $\epsilon_{E_o}$ through observations made during the post-alignment taxiing portion (i.e. as shown in FIG. 1(b)) of the navigation phase. The method operates upon the known relationship between the cross-heading velocity of a taxiing aircraft and the original east component of gyro bias error.

As mentioned earlier, once an aircraft begins taxiing and changes heading, the east component of gyro bias error and the west component of the Earth rotation rate error are no longer balanced as the original east component of gyro bias error rotates with the body of the aircraft while the west component of the Earth rotation rate error remains aligned with the reference system. As a consequence, north and east velocity errors begin to build up and those errors form the basis for the determination of the east component of the gyro bias error. Although the north and east velocity errors cannot be observed directly, the cross-track component of velocity error, $V_{CT}$, can be observed, and its relationship to the north and east velocity errors is known.

FIG. 2 is a top plan view of a taxiing aircraft for illustrating the above-described process for inertial instrument calibration in which the cross-track velocity $V_{CT}$ is employed as a surrogate for the north and east velocity errors. The method described in the above-identified paper relies upon the fact that the velocity in the cross-track direction (axis 2) should be zero as the cross-track direction is, by definition, perpendicular to the true velocity vector $V_G$. Because of the presence of the north and east velocity errors, $V_{CT}$ normally has a finite value. However, the value of $V_{CT}$ is itself corrupted by the presence of a number of errors, discussed below.

The inertial system 4 does not know the exact cross-track direction. However, when taxiing, the cross-heading direction (axis 6) differs from cross-track direction only by a small crab angle β as shown in FIG. 2. According to the above-identified paper, the cross-heading velocity $V_C$ is observed, and is then corrected by using an estimated crab angle β to obtain estimated cross-track velocity $V_{CT}$. An additional correction is made for lever arm $R_L$ (the distance between the aircraft's center of rotation 7 and the inertial navigation system 4) and the cross-track velocity is then related back to the initial east component of gyro bias error. The necessary parameter determinations may be made through calculations performed on the aircraft with the flight or navigation computer.

While the above-described system provides a useful technique for calibration of the navigation instruments, certain errors must be compensated to render that method or technique practical. Some of these result from the configuration of the aircraft while others reflect the condition of the runway surface and the surrounding physical environment. These factors complicate accurate measurement of the cross-track velocity and must be accounted for to prevent contamination of the various computations.

As discussed above, two of the three main sources of error may be readily compensated. The first of these, the crab angle error β, is a measure of the misalignment of the aircraft body with the ground track direction and reflects the fact that the wheels of an aircraft are not always pointed straight ahead while taxiing. This misalignment may result from the turning of the aircraft on the runaway, misalignment of the landing gear, unequal tire pressures and/or the wind's force transverse to the aircraft's tail. Each of these factors may cause some rotation of the aircraft relative to the tracking direction. The crab angle error is estimated by observing the cross-heading velocity $V_C$ during periods when the ground speed is large. The estimated crab angle is then used to make corrections to cross-track velocity for estimating the initial east component of gyro error during periods when ground speed and turning rate are small.

Another error implicit in the above method is produced by the lever arm $R_L$ that separates the center of rotation of the aircraft from the inertial navigational system (generally located forward of the main landing gear). This error produces an additional cross-heading velocity bias that contaminates the observed value. The lever arm is estimated by observing the cross-heading velocity during periods when the turning rate is large. The estimated lever arm is then used to make corrections for estimating initial east gyro error during periods when ground speed and turning rates are small.

A third important error source cannot be adequately modelled due to its essentially transient and random nature. That error, $\delta V_n$, is due to lateral and rotational motions of the aircraft while taxiing. Such velocity transients can result from bumps in the runway and their effects 8 upon the landing gear suspension system. This can cause the aircraft to roll and to translate both right and left as shown in FIG. 3, a frontal view of an aircraft for illustrating the relationship between landing gear suspension system motion and cross-heading velocity transients ($\delta V_n$) 10. Unfortunately, the resultant sharp velocity spikes, although transient, are so large relative to the cross-heading velocity that they can overwhelm the error due to the initial east direction gyro bias error.

SUMMARY OF THE INVENTION

The present invention overcomes the foregoing and other disadvantages of the prior art by providing, in a first aspect, an improvement in a method for calibrating an aircraft's inertial navigation system of the type wherein the cross track velocity ($V_{CT}$) of the aircraft, while taxiing, is employed. Such method is begun by measuring north velocity ($V_N$), east velocity ($V_E$), heading angle ($\psi_H$) and rate of change of heading angle ($\dot\psi_H$) and determining crab angle (β) and lever arm ($R_L$). Cross heading velocity ($V_C$) and heading velocity ($V_H$) are first determined as:

$$V_C = V_E \cos\psi_H - V_N \sin\psi_H$$

$$V_H = V_E \sin\psi_H + V_N \cos\psi_H$$

The cross track velocity is then determined according to:

$$V_{CT} = V_C - V_H \sin\beta - R_L \dot\psi_H$$

Thereafter $V_{CT}$ is integrated to generate a cross track position $P_{CT}$. Kalman gain values are determined for $V_N$, $V_E$, $\psi_H$, $\dot\psi_H$, $R_L$ and β and such gain values are multiplied by the cross track position to determine $V_N$, $V_E$, $\psi_H$, $\dot\psi_H$, $R_L$ and β errors. Such errors are then employed to calibrate the inertial navigation system.

In a second aspect, the invention provides apparatus for calibrating the inertial navigation system of a taxiing aircraft. Such apparatus includes means for measuring north velocity ($V_N$), east velocity ($V_E$), heading angle ($\psi_H$) and rate of change of heading angle ($\dot\psi_H$). Means are provided for determining crab angle (β) and lever arm ($R_L$). Means are additionally provided for determining cross heading velocity ($V_C$), heading velocity ($V_H$) and cross-track velocity $V_{CT}$ in accordance with the above-stated relationships. Means are provided for determining cross heading velocity ($V_C$) and heading velocity ($V_H$) from $V_N$, $V_E$ and $\psi_H$ and means for determining $V_{CT}$ from $V_C$, $V_H$, β, $R_L$ and $\dot\psi_H$.

Means are additionally provided for integrating $V_{CT}$ to generate a cross-track position $P_{CT}$. A Kalman filter receives values of $V_N$, $V_E$, $\psi_H$, $\dot\psi_H$, $R_L$ and β and provides gain values in response. Means are provided for multiplying the gain values by the cross-track position. Finally, means are provided for accepting the output of the last-named means and calibrating the inertial navigation system in response thereto.

The preceding and other features and advantages of this invention will become further apparent from the detailed description that follows. Such description is accompanied by a set of drawing figures. Numerals of the drawing figures, corresponding to those of the written description, point to the features of the invention with like numerals referring to like features throughout both the written description and drawings.

DETAILED DESCRIPTION

The inventor has addressed the problem of the prior art in which the above-described method for measuring the original east component of gyro bias error has been hampered and, in some instances frustrated, by the "masking" effect of the horizontal component of the random velocity spikes $\delta V_n$ that can be attributed, in part, to the presence of runway bumps. The inventor's solution relies upon various insights into the nature of the inherent boundedness of the errors due to such velocity spikes.

Figure 1A:
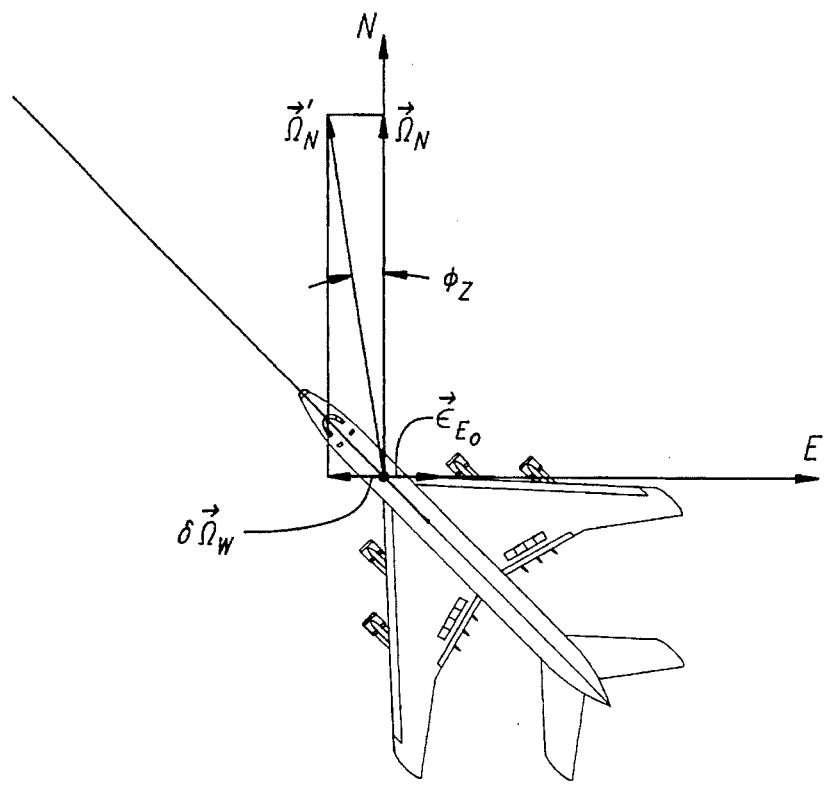
FIGS. 1(a) and 1(b) are top plan views of an aircraft during the alignment mode and the taxiing portion of the navigation mode respectively for use in illustrating the observability of the east component of gyro bias error in relation thereto.
Figure 1B:
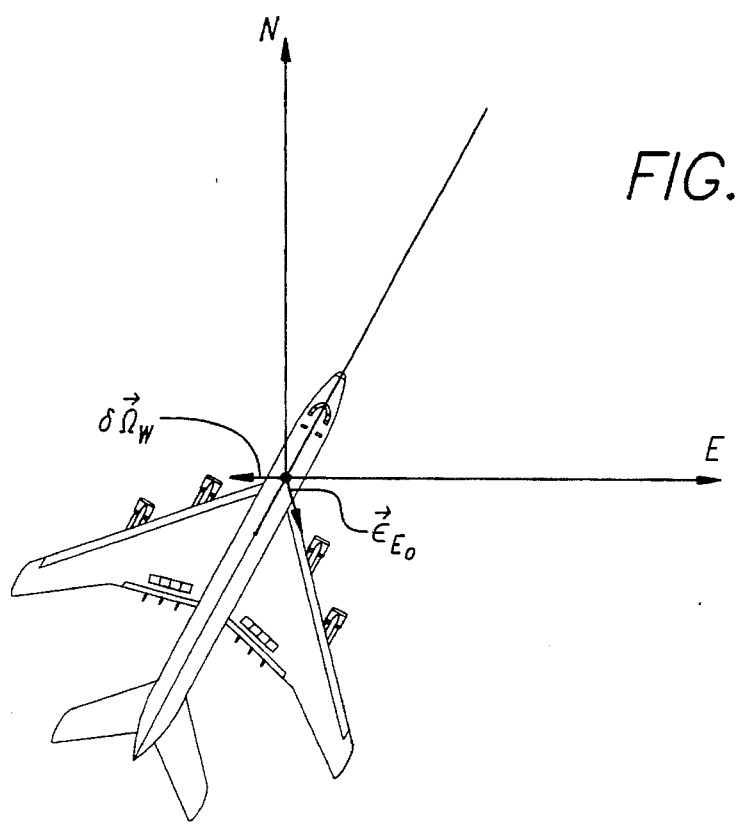
Figure 2:
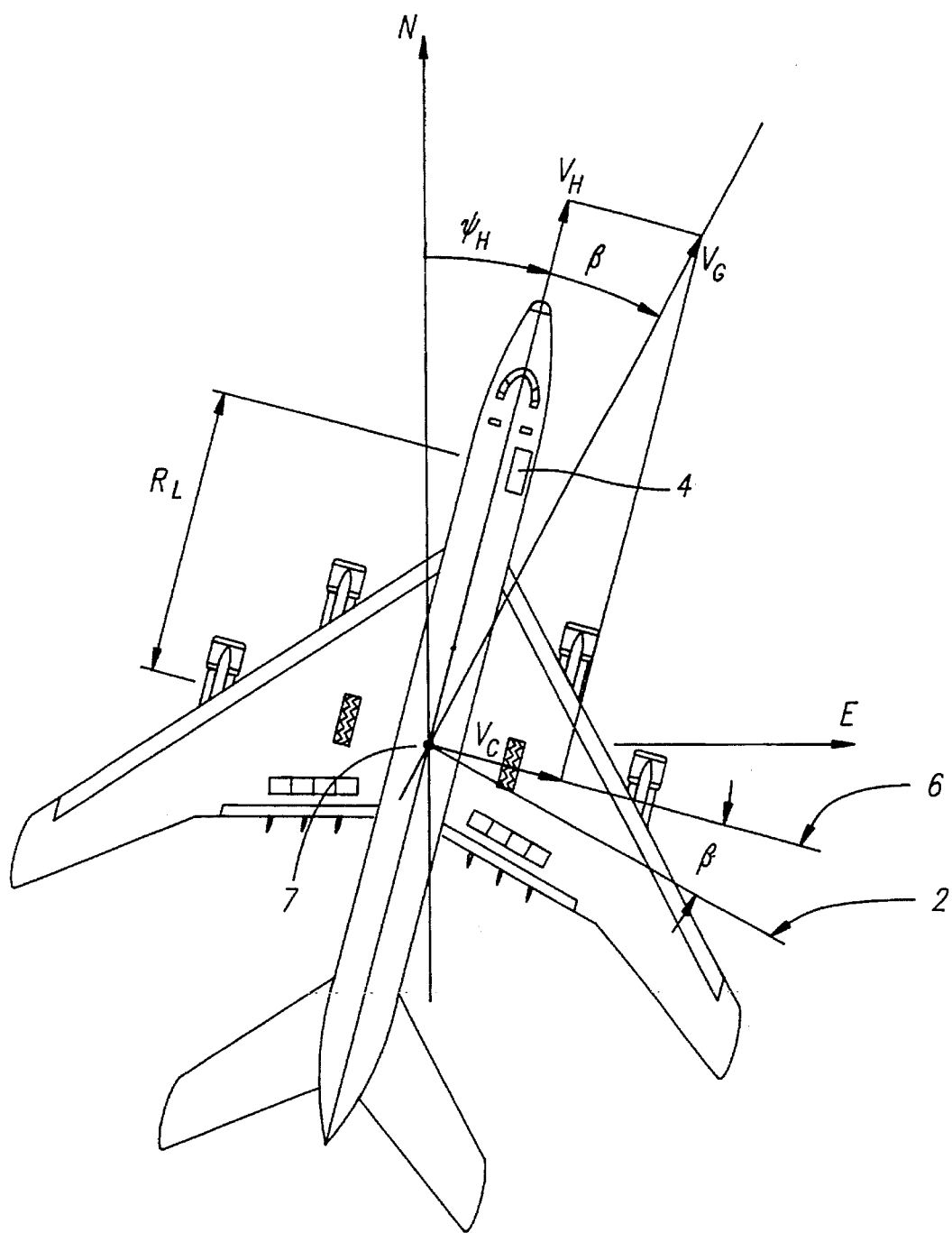
FIG. 2 is a top plan view of an aircraft for use in illustrating the process of aircraft inertial instrument calibration in which cross-track velocity is measured and utilized to correct for the east component of gyro bias error.

Referring to FIG. 2, the cross-track velocity, $V_{CT}$, is defined as follows:

$$V_{CT}=(V_E \cos \psi_H - V_N \sin \psi_H) - V_H \sin \beta - R_L \dot\psi_H$$

Figure 3:
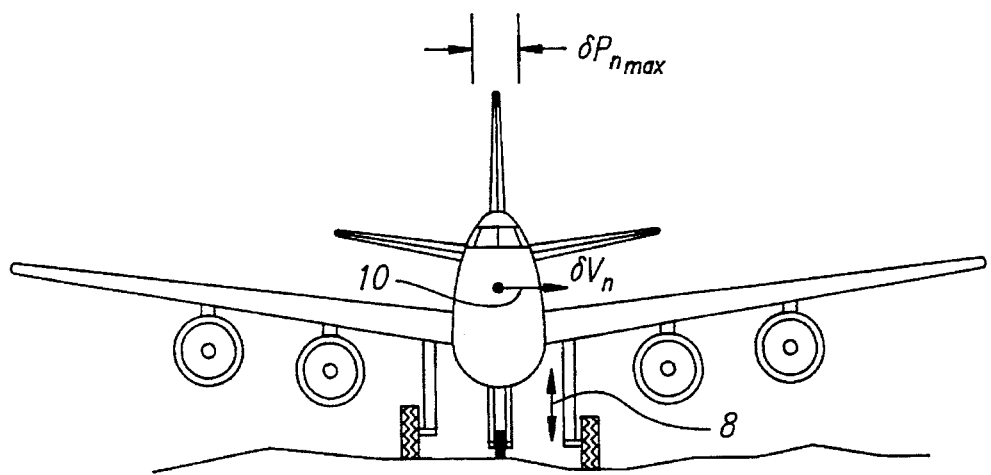
FIG. 3 is a frontal view of an aircraft for illustrating the relationship between landing gear suspension system motion and cross-heading velocity variations.

Now, referring to FIGS. 2 and 3 in combination, the measurement errors that contribute to errors in the determination of cross-track velocity, $\delta V_{CT}$, are as follows:

$$\delta V_{CT}=(\delta V_E \cos \psi_H - \delta V_N \sin \psi_H) - V_H \delta\psi_H - \dot\psi_H \delta R_L + V_n$$

As can be noted from the above expression, the randomly-occurring lateral velocity component, $\delta V_n$, affects the cross-track velocity $V_{CT}$. As discussed above, its effect can be sufficiently large to overwhelm $V_{CT}$ and thereby prevent the accurate determination of the original east gyro error by the above-described method of this inventor.

The inventor has recognized that while $\delta V_n$ may acquire a relatively large value over those brief periods of time while the aircraft "recovers" from transient shocks, during taxiing its integral is inherently bounded since a normal aircraft can be shaken back and forth only so much without breaking the landing gear. Accordingly, the integral of $\delta V_{CT}$ is also bounded.

The present invention does not attempt to estimate the value of the disturbances $\delta V_n$. Rather, it minimizes the impact of this error upon the aggregate effect of all known $V_{CT}$ error sources. Thereafter, the "calculable" sources of error are modelled out. Although the error due to $\delta V_n$ is not removed, it is minimized through the combination of its random and transient character with an integration process. Accordingly, the remaining error sources will contribute the bulk of the error represented by the cross-track position factor $P_{CT}$, discussed below.

Cross-track position PCT (the integral of $V_{CT}$) should theoretically equal zero. However, due to the error factors spelled out in the expression for $\delta V_{CT}$, it usually has a finite value. After the imaginary cross-track position $P_{CT}$ is calculated, one is left with an error term that is dominated by measurement errors pertaining to $R_L$, $\beta$, $V_E$, $V_N$, $\psi_H$ and $\dot\psi_H$. The cross-track position is then multiplied by gain factors determined by Kalman filtering of successive observations of the measured variables taken as the aircraft taxis. The products of the respective gain values with $P_{CT}$ provide the corresponding error values which may then be employed to correct or initialize the aircraft's inertial navigation system. The calibration of the system requires accurate determination of $V_{CT}$ as this parameter is employed to determine the original east gyro error.

Figure 4:
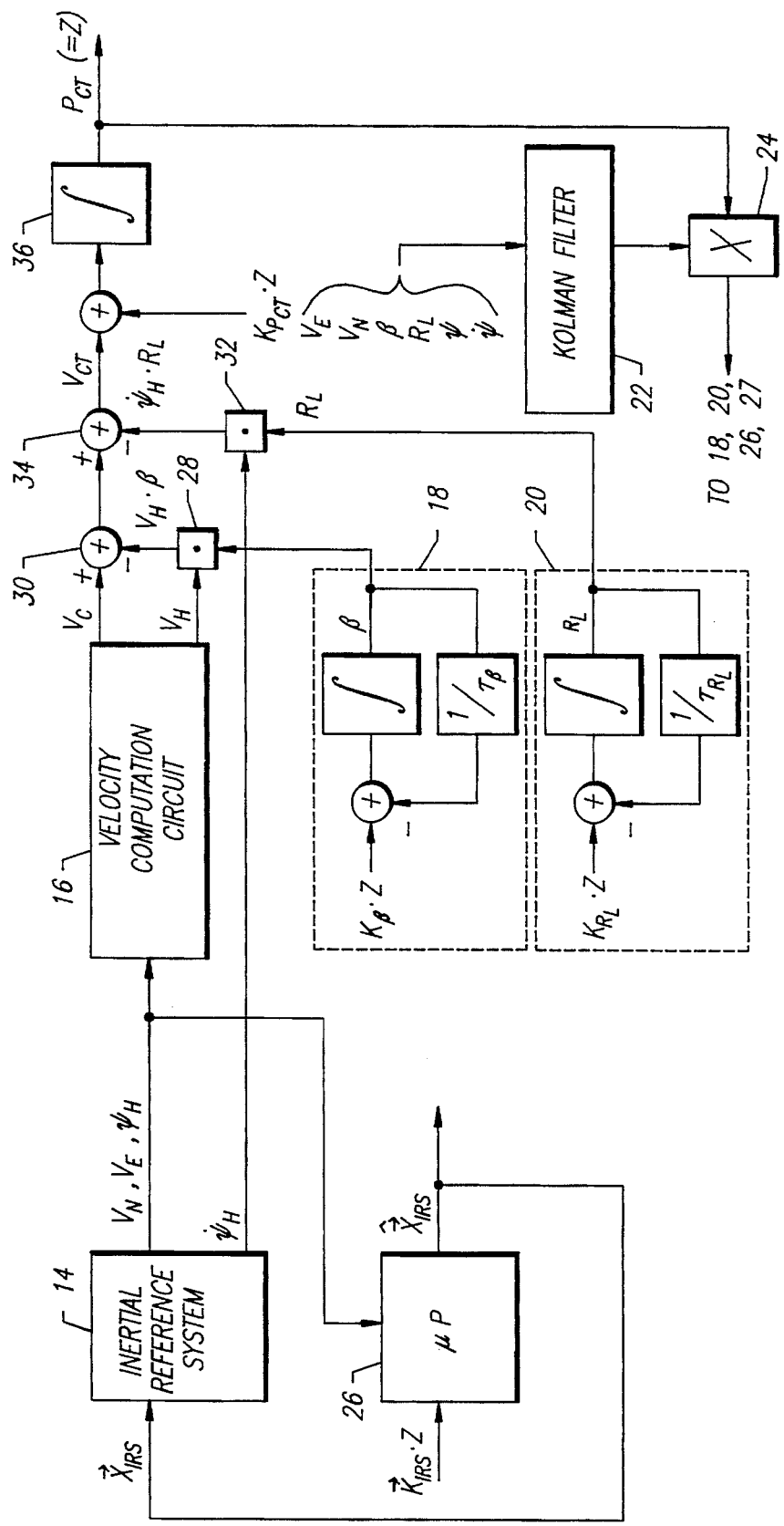
FIG. 4 is a schematic block diagram of the invention for providing corrections to an inertial instrument calibration process based upon the parameters illustrated in FIG. 2 and taking into account the error sources illustrated in FIG. 3.

FIG. 4 is a schematic block diagram of apparatus in accordance with the invention for enhancing inertial instrument calibration by the above-described method. As has already been mentioned, such method is significantly hampered by the effects of lateral velocity spikes $\delta V_n$ due to motions induced in the landing gear suspension as an aircraft taxis. Such motions are unavoidable and are due, in part, to bumps or other irregularities in the runway.

The apparatus of the invention enhances the accurate determination of the essential variable, $V_{CT}$, by correcting this derived parameter for numerous measurement errors and minimizes the effect of the remaining error $\delta V_n$ which is of a random and transient nature. The value of $V_{CT}$ is then employed to incorporate the original east gyro error into the inertial navigation system calibration process.

The inertial reference system 14 of the aircraft, comprising a known arrangement of accelerometers and gyros, measures and provides, as relevant outputs, the north and east velocity components, $V_N$ and $V_E$, heading, $\psi_H$, and the rate of change of the estimated airframe heading $\dot\psi_H$. The three former outputs are then combined by means of a velocity computation circuit 16 to derive the values of cross heading velocity, $V_C$, and velocity along the aircraft heading axis, $V_H$, in accordance with the following relationship:

$$V_C = V_E \cos \psi_H - V_N \sin \psi_H$$

$$V_H = V_E \sin \psi_H + V_N \cos \psi_H$$

The value of the crab angle $\beta$ is provided by an integrator 18, while a second integrator 20 provides the value of the lever arm $R_L$. The value of $\beta$ from the integrator 18 is combined with $V_H$ at a multiplier 28 and the resulting value is then subtracted from the cross heading velocity $V_C$ at a difference node 30. The value of the lever arm $R_L$ is combined with the rate of change of the heading $\dot\psi_H$ at a multiplier 32 and the product thereof is then subtracted, along with the output of the difference node 30, at a difference node 34. The output of the difference node 34, derived as above, is as follows:

$$V_{CT} = V_C - V_H \sin \beta - R_L \dot\psi_H$$

Where, for small crab angles, $\sin \beta$ is approximately equal to $\beta$. As can be seen, the expression for the output of the difference node 34 is equal to the (computed) aircraft velocity in the cross-track direction, $V_{CT}$. This value is applied to an integrator 36 whose output is the (imaginary) cross-track position $P_{CT}$.

Each of the integrators 18, 20 receives, as input, a value of the appropriate parameter ($\delta\beta$ or $\delta R_L$) derived as the product of cross-track position $P_{CT}$ and a Kalman gain factor that is based upon observation of the appropriate variable during taxiing and generated by a Kalman filter 22 that receives measurements of $V_E$, $V_N$, $\psi_H$ and $\dot\psi_H$, each determined by the inertial reference system 14, along with $\beta$ and $R_L$ taken as the aircraft taxis. The Kalman gain factors are applied to a multiplier 24 which also receives the value of cross-track position and provides $\delta V_E$, $\delta V_N$, $\delta\psi_H$, $\delta\dot\psi_H$, $\delta\beta$ and $\delta R_L$ as products of the cross-track position and the corresponding Kalman gain factor. The computation of gain factors by Kalman filtering is well known and explained, for example, in Gelb, "Applied Optimal Estimation" (MIT Press 1974). The values of $\delta V_E$, $\delta V_N$, $\delta\psi_H$ and $\delta\dot\psi_H$ obtained from the multiplier 24 are applied to an error calculation means such as a flight computer 26 while the updated values of $\delta\beta$ and $\delta R_L$ are applied to the integrators 18 and 20 respectively. The computer 26 performs the necessary calculations for providing a corrective calibration signal to the inertial navigation system 14 internally in accordance with the above described method in which the problems associated with the non-observability of original east gyro error are addressed by measurement of crosstrack velocity $V_{CT}$.

Thus it is seen that the invention provides an apparatus and a method for calibrating the inertial navigation system of a taxiing aircraft. The invention is suitable for enhancing the accuracy and utility of a calibration method that relies upon the parameter $V_{CT}$ to determine the original east gyro error. By obtaining an accurate value for this parameter, one may accurately initialize the inertial navigation system of the aircraft as it taxis.

While this invention has been described with reference to its presently preferred embodiment, it is not limited thereto. Rather, this invention is limited only insofar as defined by the following set of patent claims and includes within its scope all equivalents thereof.

What is claimed is:

1. In a method for adjusting the rate outputs of the gyros of an aircraft's strapdown inertial navigation system for east gyro bias error wherein the cross-track velocity ($V_{CT}$) of said aircraft is utilized to determine said east gyro bias error, the improvement comprising the steps of:

a) taxiing said aircraft substantially along a heading; and
   b) measuring north velocity ($V_N$), east velocity ($V_E$), heading ($\psi_H$) and time derivative of said heading ($\dot\psi_H$) of said aircraft while taxiing said aircraft; and
   c) determining a crab angle ($\beta$) of said taxiing aircraft; and
   d) determining a lever arm ($R_L$) of said taxiing aircraft; and
   e) determining cross heading velocity ($V_c$) and heading velocity ($V_H$) of said taxiing aircraft according to the relationships:

$$V_c = V_E \cos \psi_H - V_N \sin \psi_H$$
   $$V_H = V_E \sin \psi_H + V_N \cos \psi_H;$$

then
   f) determining $V_{CT}$ according to the relationship $$V_{CT} = V_c - V_H \sin \beta - \dot R_L \psi_H;$$

then
   g) integrating $V_{CT}$ to generate a cross-track position $P_{CT}$; and
   h) determining Kalman gain values for $V_N$, $V_E$, $\psi_H$, $\dot\psi_H$, $R_L$ and $\beta$; then
   i) multiplying said Kalman gain values by said cross-track position $P_{CT}$ to determine $V_N$, $V_E$, $\psi_H$, $\dot\psi_H$, $R_L$ and $\beta$ errors; then
   j) correcting $V_{CT}$ for said $V_N$, $V_E$, $\psi_H$, $\dot\psi_H$, $R_L$ and $\beta$ errors; and then
   k) adjusting gyro output values in accordance with said corrected value of $V_{CT}$.

2. A method as defined in claim 1 wherein said north velocity ($V_N$), said east velocity ($V_N$), said heading ($\psi_H$) and said time derivative of heading ($\dot\psi_H$) are measured by an inertial reference system.

3. A method as defined in claim 2 wherein said cross heading velocity ($V_c$) and said heading velocity ($V_H$) are determined by a velocity computation circuit.

4. A method as defined in claim 3 wherein the step of determining crab angle ($\beta$) includes the step of integrating the $\beta$ error.

5. A method as defined in claim 4 wherein the step of determining lever arm ($R_L$) includes the step of integrating the $R_L$ error.

6. Apparatus for adjusting the rate outputs of the gyros of the strapdown inertial navigation system of an aircraft while taxiing for east gyro bias error by employing the relationship between cross-track velocity ($V_{CT}$) and said error comprising, in combination:

a) means for continuously measuring north velocity ($V_N$), east velocity ($V_E$), heading ($\psi_H$) and rate of change of said heading ($\dot\psi_H$) of said taxiing aircraft;
   b) means for continuously providing crab angle ($\beta$) of said taxiing aircraft;
   c) means for continuously providing lever arm ($R_L$) of said taxiing aircraft;
   d) means for continuously determining cross heading velocity ($V_C$) and heading velocity ($V_H$) of said taxiing aircraft from $V_N$, $V_E$ and $\psi_H$;
   e) means for continuously determining $V_{CT}$ from $V_C$, $V_H$, $\beta$, $R_L$ and $\psi_H$;
   f) means for integrating $V_{CT}$ to generate a cross-track position $P_{CT}$;
   g) a Kalman filter for receiving values of $V_N$, $V_E$, $\psi_H$, $\dot\psi_H$, $R_L$ and $\beta$ and providing gain values in response thereto;
   h) means for multiplying said cross-track position by said gain values to generate error values of $V_N$, $V_E$, $\psi_H$, $\dot\psi_H$, $R_L$ and $\beta$;
   i) means for correcting $V_{CT}$ for said $V_N$, $V_E$, $\psi_H$, $\dot\psi_H$, $R_L$ and $\beta$ error values; and
   j) means for adjusting the outputs of said gyros in accordance with the corrected value of $V_{CT}$.

7. Apparatus as defined in claim 6 wherein said means for measuring north velocity ($V_N$), east velocity ($V_E$), heading ($\psi_H$) and rate of change of said heading ($\dot\psi_H$) comprises an inertial reference system.

8. Apparatus as defined in claim 7 wherein said means for determining cross heading velocity ($V_C$) and heading velocity ($V_N$) further includes:

a) a velocity computation circuit; and
   b) said velocity computation circuit determines $V_C$ and $V_H$ according to:

$$V_C = V_E \cos \psi_H - V_N \sin \psi_H$$
   $$V_H = V_E \sin \psi_H + V_N \cos \psi_H.$$

9. Apparatus as defined in claim 8 wherein said means for providing crab angle ($\beta$) comprises a first integrator.

10. Apparatus as defined in claim 9 wherein said means for providing lever arm ($R_L$) comprises a second integrator.

11. Apparatus as defined in claim 10 wherein said means for determining $V_{CT}$ comprises a circuit coupled to said inertial reference system, said velocity computation circuit, said first integrator and said second integrator.

12. A method for calibrating the gyros of a strapdown inertial navigation system of an aircraft comprising the steps of:

a) measuring the rate outputs of said gyros while said aircraft is at rest at a first heading; and
   b) resolving said rate outputs into north and east coordinates; then
   c) determining the north component of gyro rate bias error along said north coordinate; then
   d) rotating said aircraft to a second heading; and
   e) taxiing said aircraft substantially along said second heading; then
   f) determining the cross-track velocity of said aircraft from values of north and east velocity, heading and heading rate, crab angle and lever arm measured while taxiing; and
   g) integrating said cross-track velocity to generate a cross-track position; and h) generating Kalman gain vales of said north and east velocity, heading and heading rate, crab angle and lever arm; then i) deriving error corrections to said cross-track velocity by multiplying said Kalman gain values by said cross-track position; then j) correcting said cross-track velocity with said error corrections; then k) deriving the east component of gyro bias error from said corrected cross-track velocity; and then l) adjusting the outputs of said gyros by correcting for said north and east components of gyro rate bias error based upon measurements made prior to takeoff.

* * * * *